United States Patent
Sigler et al.

(10) Patent No.: US 8,052,029 B1
(45) Date of Patent: Nov. 8, 2011

(54) METHOD OF CALIBRATING A FRICTION STIR SPOT WELDING SYSTEM

(75) Inventors: David R. Sigler, Shelby Township, MI (US); Blair E. Carlson, Ann Arbor, MI (US); Robert T. Szymanski, St. Clair Township, MI (US); Mark T. Hall, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/873,648

(22) Filed: Sep. 1, 2010

(51) Int. Cl.
*B23K 20/12* (2006.01)

(52) U.S. Cl. ..................................... 228/103; 228/112.1

(58) Field of Classification Search .......................... None
See application file for complete search history.

(56) References Cited

U.S. PATENT DOCUMENTS

| | | | | |
|---|---|---|---|---|
| 5,713,507 A * | 2/1998 | Holt et al. | .................. | 228/112.1 |
| 6,029,879 A * | 2/2000 | Cocks | ............................ | 228/2.1 |
| 6,138,895 A * | 10/2000 | Oelgoetz et al. | ........... | 228/112.1 |
| 6,168,066 B1 * | 1/2001 | Arbegast | ....................... | 228/102 |
| 6,421,578 B1 * | 7/2002 | Adams et al. | .................. | 700/212 |
| 6,497,355 B1 * | 12/2002 | Ding et al. | ..................... | 228/2.1 |
| 7,641,739 B2 * | 1/2010 | Matlack et al. | .................... | 134/6 |
| 2002/0027155 A1 * | 3/2002 | Okamura et al. | .......... | 228/112.1 |
| 2003/0047590 A1 * | 3/2003 | Okamoto et al. | ............. | 228/127 |
| 2003/0183673 A1 * | 10/2003 | Hansen et al. | ................. | 228/2.1 |
| 2003/0209586 A1 * | 11/2003 | Thompson | ..................... | 228/103 |
| 2004/0074944 A1 * | 4/2004 | Okamoto et al. | ............... | 228/2.1 |
| 2005/0001010 A1 * | 1/2005 | Koga et al. | ....................... | 228/2.1 |
| 2005/0006441 A1 * | 1/2005 | Adams et al. | ............... | 228/114.5 |
| 2005/0051602 A1 * | 3/2005 | Babb et al. | ................. | 228/112.1 |
| 2005/0121497 A1 * | 6/2005 | Fuller et al. | ................. | 228/112.1 |
| 2007/0284419 A1 * | 12/2007 | Matlack et al. | ............ | 228/112.1 |
| 2008/0006677 A1 * | 1/2008 | Kumagai et al. | ............... | 228/101 |
| 2008/0073409 A1 * | 3/2008 | Ostersehlte | ................... | 228/102 |
| 2008/0083817 A1 * | 4/2008 | Baumann et al. | ............. | 228/102 |
| 2008/0135601 A1 * | 6/2008 | Chen et al. | ..................... | 228/102 |
| 2009/0001133 A1 * | 1/2009 | Kuramochi | .................... | 228/103 |
| 2010/0065092 A1 * | 3/2010 | Matlack et al. | ............... | 134/105 |
| 2010/0072261 A1 * | 3/2010 | Cruz et al. | ..................... | 228/102 |
| 2011/0079339 A1 * | 4/2011 | Cruz et al. | ...................... | 156/64 |

FOREIGN PATENT DOCUMENTS

JP        2002-346769 A   *  12/2002

OTHER PUBLICATIONS

Derwent-ACC-No. 2010-Q30225 (no date available).*

* cited by examiner

*Primary Examiner* — Kiley Stoner
(74) *Attorney, Agent, or Firm* — Quinn Law Group, PLLC

(57) ABSTRACT

A method of performing a plurality of friction stir spot welds with a friction stir spot welding (FSSW) system includes measuring a length of a pin of a weld tool of the FSSW system. The length is compared to a first limit to determine if the length is above or below the first limit. Debris is removed off of a tip of the pin when the length is determined to be above the first limit. The length is also compared to a second limit to determine if the length is above or below the second limit. At least one friction stir spot weld is performed on a workpiece when the length is determined to be less than the first limit and above the second limit.

16 Claims, 5 Drawing Sheets

METHOD OF CALIBRATING A FRICTION STIR SPOT WELDING SYSTEM

TECHNICAL FIELD

The present invention relates to a method of calibrating a friction stir spot welding system.

BACKGROUND OF THE INVENTION

Welding is a manufacturing or fabrication process that bonds materials, usually metals or thermoplastics, by causing coalescence—the process by which two separate units grow together, fuse, or merge into a single body. The materials are joined by liquefying or plasticizing (e.g., soften without liquefying) the areas to be bonded together, generally through the application of heat and/or pressure over time, promote coalescence of the liquefied or plasticized material, and allow the coalesced material to cool, thereby completing the bond. Welding can be used, for example, to join two or more workpieces or for operating on a single workpiece (i.e., to repair a crack or join a member).

SUMMARY OF THE INVENTION

A method of calibrating a friction stir spot welding system is provided. The method includes measuring a length of a pin on a weld tool. The length is compared to a first limit to determine if the length is above or below the first limit. Debris is removed off of a tip of the pin when the length is determined to be above the first limit.

A method of performing a plurality of friction stir spot welds with a friction stir spot welding (FSSW) system is provided. The method includes measuring a length between a reference point on a weld tool and an anvil of the FSSW system. The length is compared to a control window to determine if the length is above or below a first limit. Debris is removed from a tip of a pin when the length is determined to be greater than the first limit. At least one friction stir spot weld is performed on a workpiece when the length is determined to be less than the first limit.

A method of performing a friction stir spot weld is also provided. The method includes contacting a first tip of a body portion of a weld tool or friction stir tool to a point of reference such as an anvil to measure a length between a reference point on a weld tool and the anvil. Alternatively, the point of reference can be a separate member such as a point on the robot or a separate fixture. The length is compared to a first limit to determine if the length is above or below the first limit. If the length exceeds the first limit, then debris has accumulated on a second tip of a pin of the body portion and must be removed. The first tip of the body portion of the weld tool is contacted to a workpiece and the pin is rotated on the workpiece to remove the debris from the second tip of the pin. To verify that the debris was removed from the second tip of the pin after rotating the pin on the workpiece, the first tip is recontacted with the anvil to measure the length between the reference point on the weld tool and the anvil. At least one friction stir spot weld is performed in the workpiece when the length is determined to be below the first limit.

The above features and advantages, and other features and advantages, of the present invention are readily apparent from the following detailed description of the preferred embodiments and best modes for carrying out the invention when taken in connection with the accompanying drawings.

DESCRIPTION OF THE PREFERRED EMBODIMENTS

Figure 1:
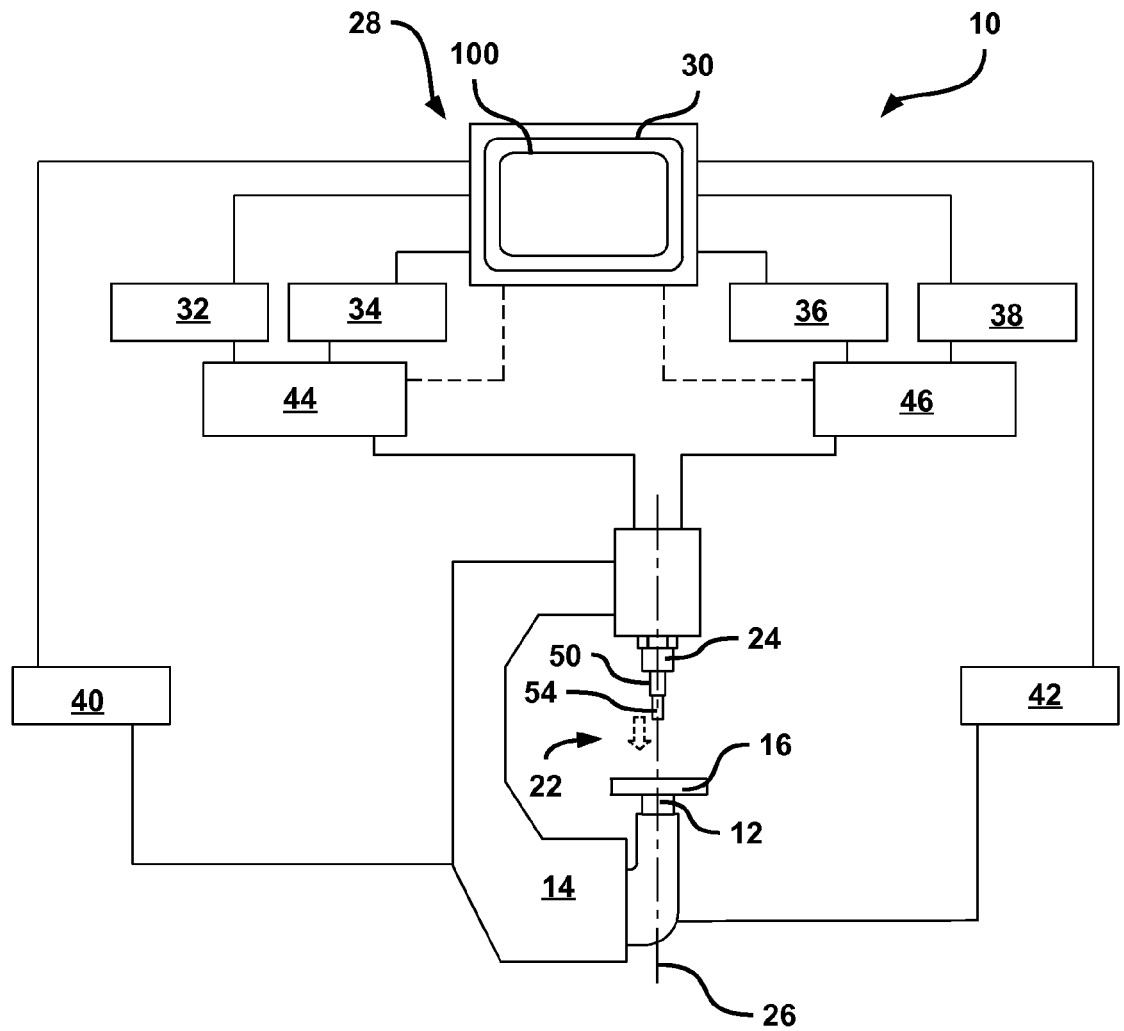
FIG. 1 is a partial side-schematic view of an exemplary friction stir spot welding (FSSW) system having a plurality of sensors connected to a microprocessor-based control unit configured for carrying out control of the present invention.

Referring to the Figures, wherein like reference numbers refer to like components throughout the several views, there is shown a friction stir spot welding (FSSW) system, partially illustrated and identified generally in FIG. 1 as element 10. The FSSW system 10 may be used to operate on a single workpiece, to join two or more workpieces together, or to join two ends of a single workpiece together. In addition, the FSSW system 10 may be applied in both 2-dimensional and 3-dimensional applications.

Figure 2:
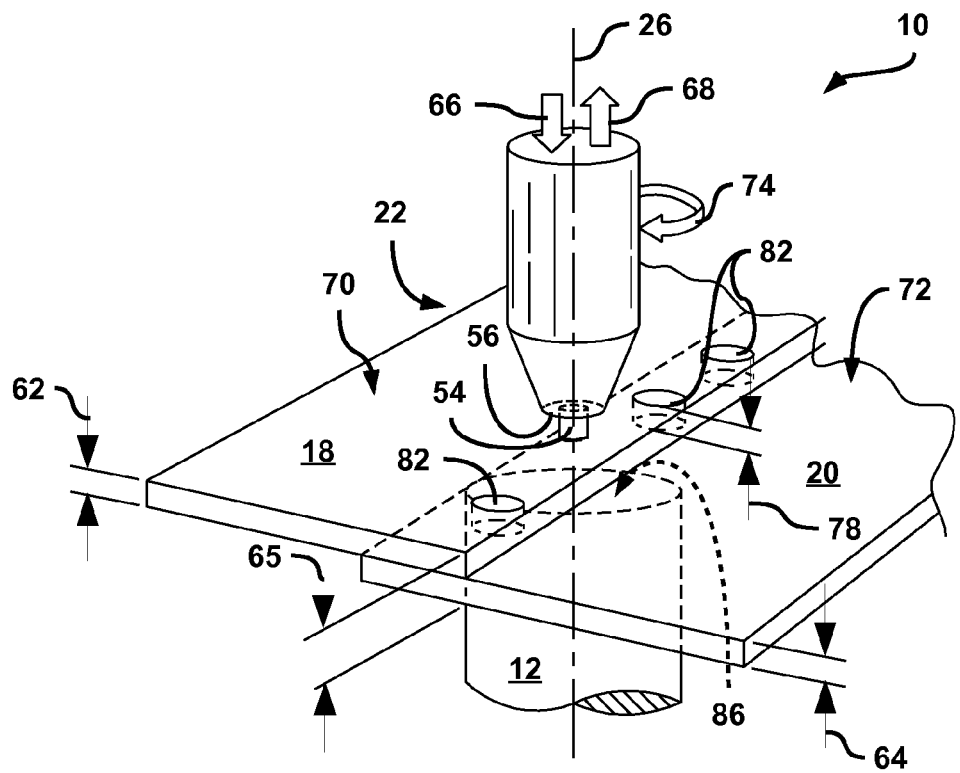
FIG. 2 is an enlarged schematic isometric depiction of FSSW system in accordance with the system of FIG. 1.
Figure 3:
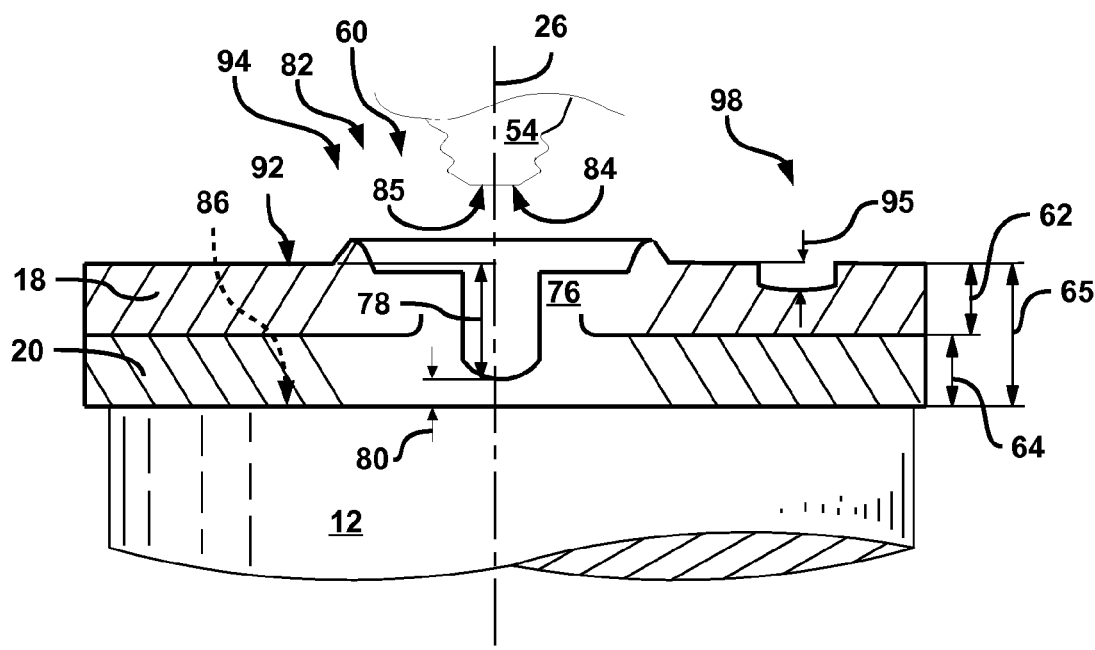
FIG. 3 is a partial cross-sectional side view of a FSSW welding tool and tool sleeve.

The FSSW system 10 includes an anvil 12 and a frame 14, also referred to by those skilled in the art as a "C-Frame". The anvil 12 may be mounted to the frame 14 so that a single workpiece 16, as depicted in FIG. 1, or a plurality of workpieces, represented herein by first and second workpieces 18, 20, as depicted in FIGS. 2 and 3, may abut against, and be supported by, the anvil 12 during welding. The FSSW system 10 also includes a weld tool 22 and a tool sleeve 24. The weld tool 22 and the tool sleeve 24 may be arranged to be coaxially opposed with the anvil 12 along a Z axis 26, as depicted in FIG. 1. Although illustrated throughout the several Figures as having generally cylindrical or columnar shapes, it is contemplated that the anvil 12 and tool sleeve 24 could be of any geometric shape.

Still referring to FIG. 1, the FSSW system 10 also includes a controller, depicted in FIG. 1 as a micro-processor based electronic control unit (ECU) 28, having a suitable amount of programmable memory 30. The controller 28 further includes a control method or algorithm 100 that periodically calibrates the FSSW system 10, as will be discussed in detail below.

The FSSW system 10 also includes a plurality of sensing mechanisms, represented herein by sensors/transducers 32, 34, 36, 38, 40, 42, connected to the controller 28 and configured to continuously monitor, track, and/or detect various system parameters, as will be discussed in detail below. Correspondingly, the sensors 32, 34, 36, 38, 40, 42 are also configured to transmit signals to the controller 28 representative or indicative of the system 10 parameters being monitored, tracked, or detected. The communication between the sensors 32, 34, 36, 38, 40, 42 and controller 28 should not be restricted to the use of electric cables ("by wire"), but may be, for example, by any wireless technology or by electro-mechanical communication (not shown.)

Referring again to FIG. 1, the FSSW system 10 also includes a driving or plunging mechanism and a tool rotating mechanism, such as servomechanisms 44 and 46, respectively, which are connected to the controller 28 via one or more of the sensors 32, 34, 36, 38, 40, 42, or directly connected to the controller 28 (depicted in phantom in FIG. 1).

The plunging and rotating mechanisms 44, 46 may be, by way of example, electric, pneumatic, hydraulic, and/or magnetic devices. The controller 28 is configured or programmed, in part, to control the operation of the plunging and rotating mechanisms 44, 46. The control of the plunging and rotating mechanisms 44, 46 may be based upon the signals of one or more of the sensors 32, 34, 36, 38, 40, 42. For example, one or more of the sensors 32, 34, 36, 38, 40, 42 may be configured to detect at least one of the position, the plunge speed, the applied pressure, the rotational speed, the applied torque of the weld tool, and the like.

Figure 4:
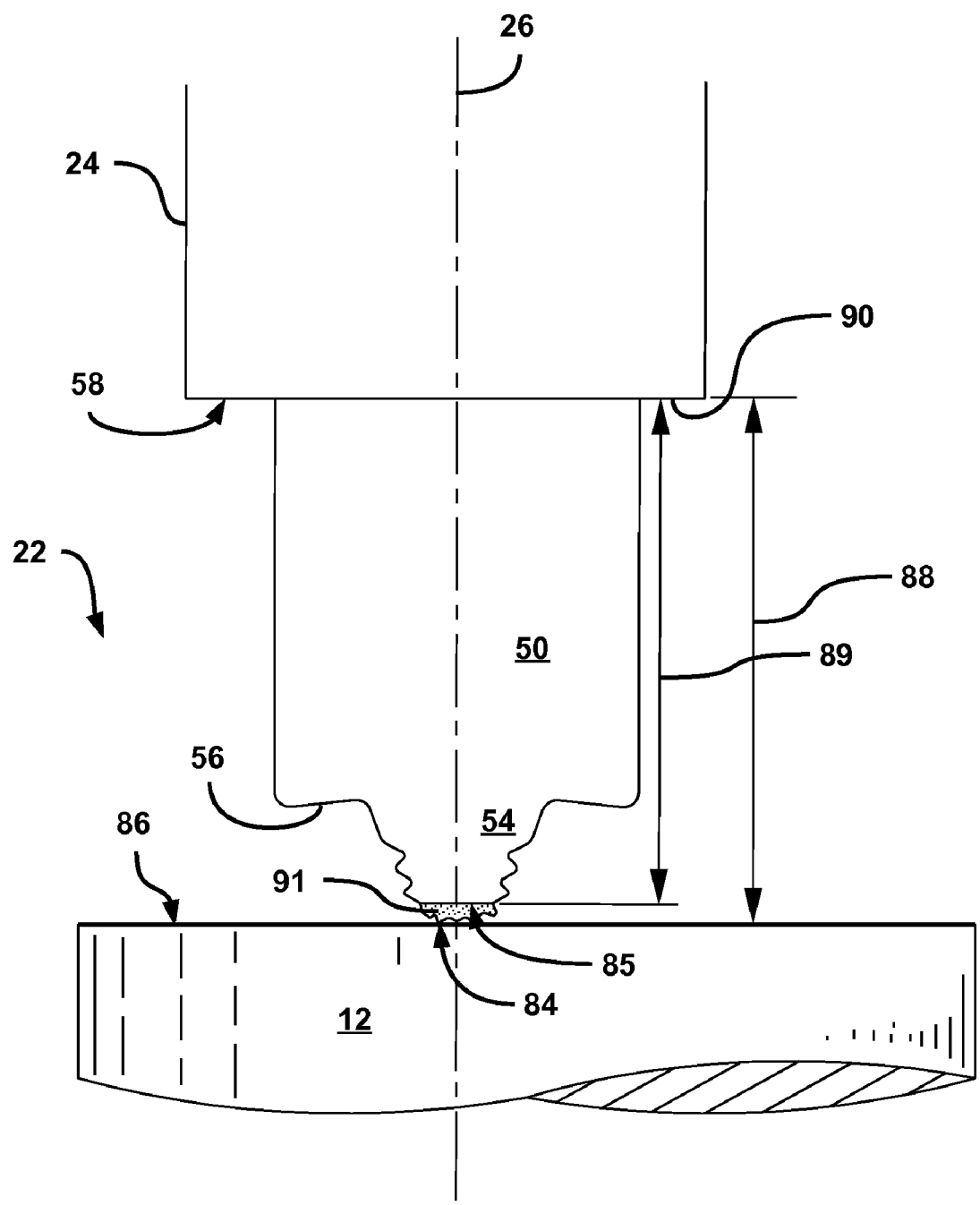
FIG. 4 is fragmentary side-view of a pin, tool sleeve, and anvil of the FSSW system illustrating a tip of the pin contacting the anvil to measure a length between a reference point and the anvil while calibrating the FSSW system.

As best seen in FIG. 4, the weld tool 22 includes a body portion 50 projecting substantially perpendicular from a shouldered portion 56 to a first tip 84. The body portion 50 includes a threaded or otherwise profiled probe or pin 54 that extends to a second tip 85. The body portion 50 may also include debris 91, as illustrated in FIG. 4, which periodically adheres to the second tip 85 of the pin 54 during the performance of one or more FSSW welds 82, explained in more detail below. The presence of debris 91 affects the location of the first tip 84, relative to the second tip 85, along the Z axis, as illustrated in FIGS. 3 and 4. More specifically, referring to FIG. 3, when debris 91 is not present on the second tip 85 of the pin 54, the first tip 84 and the second tip 85 share the same surface. However, referring to FIG. 4, when debris 91 accumulates on the second tip 85, the first tip 84 and the second tip 85 are different surfaces on the body portion 50 of the weld tool 22. Therefore, comparing FIGS. 3 and 4, when debris 91 is present on the second tip 85 of the body portion 50, the body portion 50 becomes more elongated along the Z axis 26 than when debris 91 is not present on the second tip 85 of the pin 54.

The weld tool 22 may be inserted into a receiving face 58 of the tool sleeve 24 to be removably secured, attached, or locked to the tool sleeve 24. The shouldered portion 56 and body portion 50, including the pin 54, of the weld tool 22 may be coaxially disposed with the tool sleeve 24 and configured to be translated along and rotated about the Z axis 26 by the plunging and rotating mechanisms 44, 46, respectively.

As depicted in FIGS. 2 and 3, the first and second workpieces 18 and 20 are superposed, abutted, or overlapped to form a working region, identified generally as 60 in FIG. 3. The sum total of the first workpiece thickness 62 and the second workpiece thickness 64 is referred to hereinafter as the "total stack-up" thickness 65. The total stack-up thickness may also be defined as the thickness of the single workpiece 16, as shown in FIG. 1, or the sum total thickness of a multitude of workpieces (not shown).

As illustrated in FIG. 2, the weld tool 22 is pressed or plunged one or more times, as depicted by arrows 66 and 68, into the working region 60 through top planes 70, 72 of the first and second workpieces 18, 20, respectively, and contemporaneously rotated, as depicted by the arrow 74. The plunging and rotation of the weld tool 22 generates large amounts of frictional heat between the pin 54, the shouldered portion 56, and the first and second workpieces 18, 20. This operation/process produces a local region of highly plasticized material (identified generally by element 76 in FIG. 3) around the pin 54. As the first and second workpieces 18 and 20 plasticize, the pin 54 is able to navigate along the Z axis 26 to reach a plunge distance 78, defined initially as the total stack-up thickness 65, i.e., the first workpiece thickness 62 plus the second workpiece thickness 64, less a bottom thickness or dimension 80. The bottom thickness 80 is the remaining thickness of the first and second workpieces 18, 20, along the Z axis 26 that has not been displaced along the Z axis 26 by the pin 54, as shown in FIG. 3. The rotation 74 of the weld tool 22 and ensuing frictional heat effectively "stirs" the plasticized material 76 in the working region 60. As discussed above, debris 91 may adhere to the second tip 85 of the pin 54 during the performance of one or more FSSW welds 82. The debris 91 may be metal, such as aluminum, magnesium, copper, and the like. When debris 91 accumulates on the second tip 85 such that the first tip 84 and the second tip 85 of the pin 54 do not share the same surface, the plunge distance 78 varies, affecting the bottom thickness 80. Notably, the direction of rotation 74 can be clockwise (as illustrated in FIG. 2) or counterclockwise (not shown), without departing from the scope of the present invention.

One or more of the sensors 32, 34, 36, 38, 40, 42 signal to the controller 28 that the plunge distance 78 has been achieved. After the pin 54 achieves the desired plunge distance 78, the pin 54 and the shouldered portion 56 are withdrawn from the working region 60, illustrated by arrow 68 of FIG. 2, allowing the plasticized material 76 of FIG. 3 to cool and harden, thereby reversing the plasticized condition. Once the working region 60 is hardened, a FSSW weld 82 is formed, joining the first workpiece 18 to the second workpiece 20. The method of FSSW described herein may also be applied to other types of solid-state welding techniques. Additionally, the method of FSSW may be applied to all FSSW welding machines, including, but not limited to, robot-carried C-guns, pedestal-type machines and gantry-type machines.

The bottom thickness 80 is important to the strength of the FSSW weld 82. Even minor unintended variations in the plunge distance 78 (on the scale of a tenth of a millimeter) and hence in the bottom thickness 80 can result in the final work product failing to comply with pre-established product tolerances. Therefore, a variation in the bottom thickness 80 may result in a reduction in strength. Accordingly, a method of calibrating a length 89 of the pin 54 on the weld tool 22 is provided at 100 in FIG. 5 in order to verify that the length 89 is within a control window where FSSW welds 82 with the desired bottom thickness 80 will be achieved. Referring to the embodiment shown in FIG. 4, calibrating the length 89 of the pin 54 controls the plunge distance 78, and the resultant bottom thickness 80, throughout the welding process to achieve the mechanical properties necessary to meet pre-established weld tolerances uniformly among the series of resultant FSSW welds 82.

In order to establish or measure the length of the pin 54, the method 100 requires a step 102 of determining a distance 88 between a reference point 90 on the weld tool 22, shown as the shouldered portion 58 in FIG. 4, and a top surface 86 of the anvil 12. More specifically, the step 102 requires physically contacting the first tip 84 to the top surface 86 of the anvil 12 to determine the distance 88 between the reference point 90 on the weld tool 22 and the top surface 86 of the anvil 12. One or more of the sensors 32, 34, 36, 38, 40, 42 are configured to detect the distance 88 and communicate the detected distance 88 to the controller 28.

Next, step 104 requires comparing the detected distance 88 to a first limit, i.e., an upper limit of the control window. If the detected distance 88 is determined to be greater than the first limit, debris 91 is considered to be present and the first tip 84 and the second tip 85 do not share the same surface, the debris 91 needs to be removed to achieve the desired distance 88. Additionally, if the detected distance 88 is determined at step 104 to be less than a second limit, i.e., a lower end of the control window, the pin 54 is too short, typically as a result of tool wear, and the pin 54 should be replaced. If, however, the detected distance 88 is determined at step 104 to be between the first and second limit, the pin 54 is considered to be of an acceptable distance 88 to perform one or more FSSW welds 82 at step 110.

When the detected distance 88 is greater than the first limit, the method 100 requires the removal of the debris 91 from the second tip 85 of the pin 54. To remove the debris 91, step 106 requires one or both of the first and second workpieces 18, to be placed on the top surface 86 of the anvil 12. Next, step 108 requires the first tip 84 to be brought into contact with an uppermost surface 92 of one of the workpieces 18, 20. Once the first tip 84 is contacting the uppermost surface 92 of the one of the workpieces 18, 20, the pin 54 is rotated on the uppermost surface 92, via the weld tool 22 such that the debris 91 can be sufficiently removed from the second tip 85 of the pin 54. The first tip 84 may be brought into contact with the uppermost surface 92 of the workpieces 18, 20, adjacent a desired location 94 of the FSSW welds 82, at a cleaning location 98, as shown in FIG. 3. Alternatively, the first tip 84 may be configured to contact one of the actual locations 94 where a FSSW weld 82 will be applied after the calibration method 100 of the FSSW system 10 is complete. The rotational contact of the pin 54 with the uppermost surface 92 of one of the workpieces 18, 20 should be of sufficient speed and cleaning plunge distance 95 to remove the debris 91 from the first tip 84 of the pin 54, without forming a weld 24 or having additional debris 91 accumulate on the second tip 85 of the pin 54. More specifically, referring again to FIG. 3, the first tip 84 may be configured to contact the uppermost surface 92 of one of the workpieces 18, until the first tip 84 achieves a cleaning plunge distance 95 within the respective workpieces 18, 20 of no more than approximately 20% of the thickness 62 of the first workpiece 18. Additionally, the pin 54 may be rotated at a speed of between approximately 800 and 2,500 revolutions per minute (RPM).

After the debris 91 is removed from the second tip 85 of the pin 54 in step 108, steps 102 and 104 are repeated to verify that the distance 88 between the reference point 90 and the top surface 86 of the anvil 12 is below the first limit and above the second limit. Steps 102 through 108 may be performed repeatedly until the distance 88 between the reference point 90 and the top surface 86 of the anvil 12 are finally determined to be below the first limit. Alternatively, the FSSW system 10 may include a counter that counts the number of times steps 102 through 108 are repeated. If the count exceeds a predetermined number, then the controller 28 may be configured to send a signal and alert an operator that the FSSW system 10 is not calibrating properly and needs to be serviced.

If the detected distance 88 between the reference point 90 and the top surface 86 of the anvil 12 is determined to be less than the first limit and greater than the second limit, the controller 28 signals that the FSSW system 10 is calibrated. FSSW welds 82 are then allowed to be formed by the FSSW system 10 in the first and second workpieces 18, 20 at step 110.

The controller 28 may be configured such that the calibration method 100 is triggered periodically to calibrate the distance 88 between the reference point 90 and the top surface 86 of the anvil 12. More specifically, the calibration method 100 may be triggered to calibrate the distance after a plurality of the FSSW welds 82 are performed. For example, the distance 88 between the reference point 90 and the top surface 86 of the anvil 12 may be measured after every three FSSW welds 82 are performed. It should be appreciated that the number of the FSSW welds 82 are performed before and after the FSSW system 10 is calibrated may be more or less than as described herein. Using the workpieces 18, 20 as part of the cleaning of the pin 54 means that during the welding process, where a number of FSSW welds 82 are made in succession, recalibration of the FSSW system 10 typically needs to be performed a number of times on the same workpieces 18, 20. If the cleaning debris 91 off of the second tip 85 is required during recalibration of the FSSW system 10, using the same workpieces 18, 20 would greatly diminish motion of the weld tool 22 by keeping the weld tool 22 at or near the locations 94 of the FSSW welds 82 instead of having to further interrupt the welding process by moving the weld tool to a cleaning station located away from the workpieces 18, 20 to remove the debris 91 from the second tip 85 of the pin 54. Keeping the weld tool 22 at or near the workpieces 18, 20 is more efficient by diminishing motion of the weld tool 22 and its effect on throughput of the workpieces 18, 20.

Figure 5:
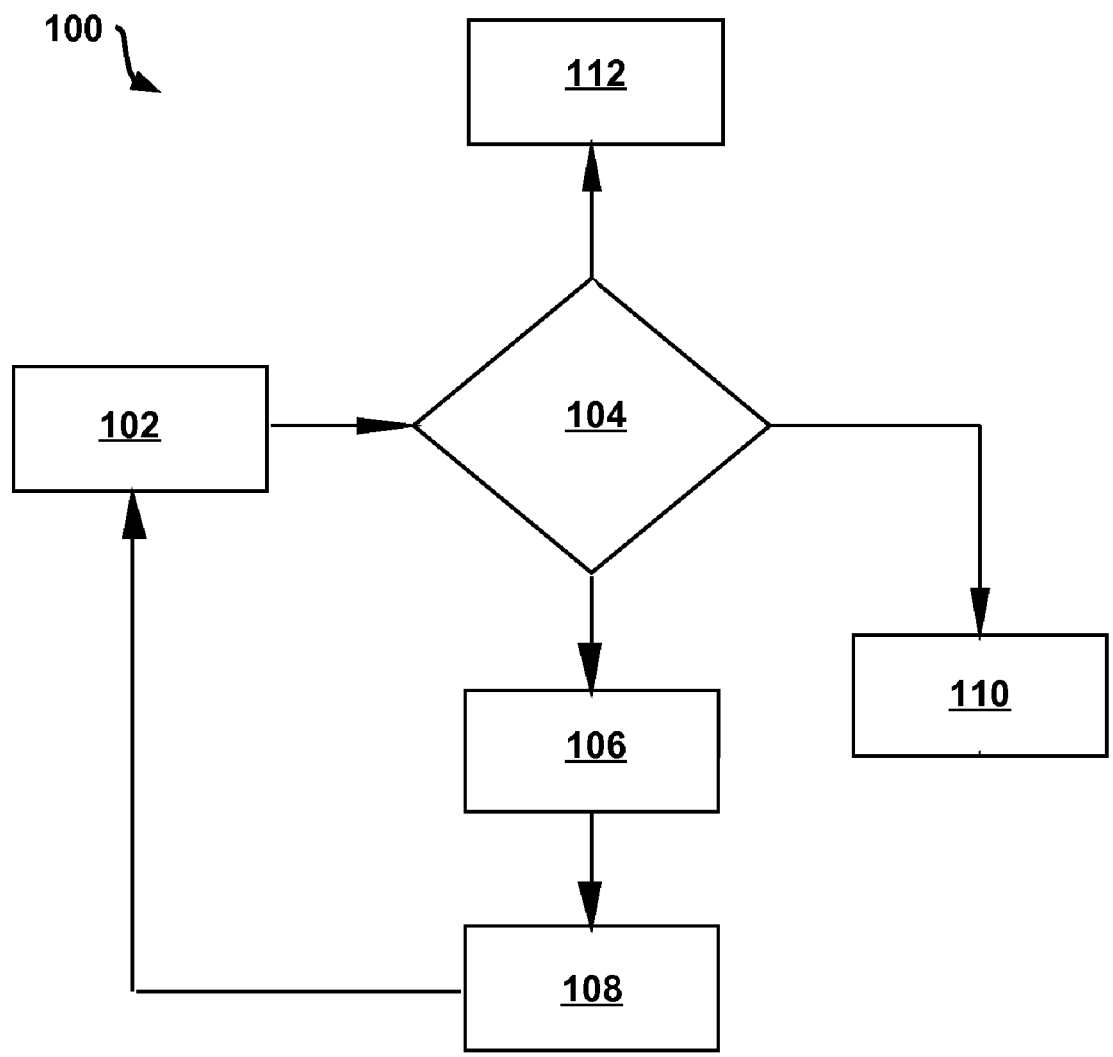
FIG. 5 is a flow chart illustrating a method of calibrating the FSSW system.
Figure 6:
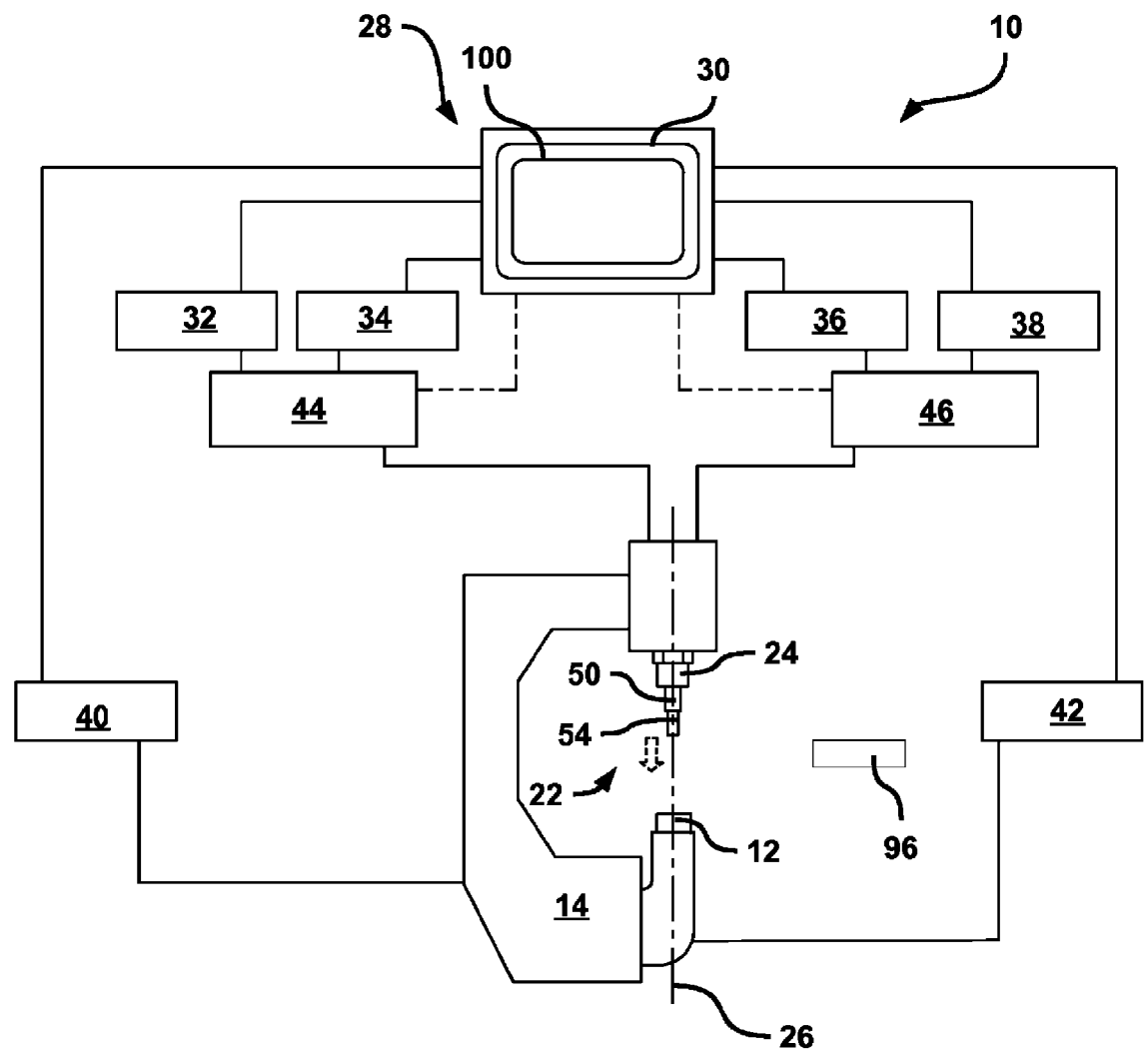
FIG. 6 is a partial side-schematic view of the FSSW system providing a cleaning medium for cleaning debris from the tip of the pin when calibrating the FSSW system.

Referring now to FIGS. 5 and 6, the first tip 84 may be placed into contact with a cleaning medium 96 in step 106. More specifically, referring to FIG. 6, the FSSW system 10 is shown with the cleaning medium 96 located away from the anvil 12. Accordingly, the weld tool 22, along with the pin 54, must be moved away from the anvil 12 and into contact with the cleaning medium 96. In step 108, the debris 91 may be removed from the second tip 85 by contacting the first tip 84 to the cleaning medium 96 such that rotation of the pin 54 on the cleaning medium 96 removes the debris 91 from the second tip 85 of the pin 54. Alternatively, the cleaning medium 96 could be configured such that rotation of the pin 54 is not required to remove the debris 91. Rather, the cleaning medium 96 may be configured as an ultrasonic bath, ultrasonic transducer, a rotating medium such as a wire wheel, wire brush or a blasting medium such as sand or glass that functions to remove the debris 91 from the second tip 84 of the pin 54. Once step 108 is completed, the weld tool 22, along with the pin 54, are moved back to the anvil 12 such that steps 102 and 104 are performed again to verify the debris 91 has been removed from the second tip 85 of the pin 54.

Additionally, if the detected distance 88 between the reference point 90 and the top surface 86 of the anvil 12 is determined at step 104 to be less than the second limit, the controller 28 may signal at step 112 that the pin 54 is too short.

While the best modes for carrying out the present invention have been described in detail herein, those familiar with the art to which this invention pertains will recognize various alternative designs and embodiments for practicing the invention within the scope of the appended claims.

The invention claimed is:

1. A method of calibrating a friction stir spot welding system, the method comprising:
   determining a length of a pin of a weld tool;
   comparing the length to a first limit to determine the length to be above the first limit;
   contacting a first tip of a body portion of the weld tool, including the pin, to a workpiece; and
   rotating the pin on the workpiece to remove debris from a second tip of the pin when the length is determined to be above the first limit.

2. A method, as set forth in claim 1, further comprising comparing the length to the first limit after removing debris off of the tip of the pin to determine if the length is above or below the first limit.

3. A method, as set forth in claim 1, wherein determining a length is further defined as contacting a tip of a body portion of the weld tool, including the pin, to an anvil to measure a distance between a reference point on the weld tool and the top surface of the anvil.

4. A method, as set forth in claim 1, wherein determining a length is further defined as measuring a distance from a first tip of a body portion of the weld tool, including the pin, to a reference point on the weld tool;
  wherein comparing the length to a first limit is further defined as comparing the distance to a first limit to determine if the distance is above or below the first limit; and
  wherein removing debris is further defined as removing debris off of a second tip of the pin when the distance is determined to be above the first limit.

5. A method, as set forth in claim 1, wherein contacting the first tip of the body portion to the workpiece is further defined as contacting the first tip to the workpiece until the first tip achieves a cleaning plunge distance.

6. A method, as set forth in claim 1, wherein rotating the pin is further defined as rotating the pin at a speed of between approximately 800 and 2,500 RPM.

7. A method, as set forth in claim 1, further comprising:
  comparing the length to a second limit to determine if the length is above or below the second limit; and
  signaling that the length of the pin is too short if the length is determined to be below the second limit.

8. A method, as set forth in claim 7, further comprising performing at least one weld on the workpiece when the length is determined to be below the first limit and above the second limit.

9. A method of performing at least one friction stir spot weld with a friction stir spot welding (FSSW) system, the method comprising:
  measuring a length of a pin of the FSSW system;
  comparing the length to a first limit to determine the length is above the first limit;
  contacting a first tip of a body portion of a weld tool to a workpiece;
  rotating the pin on the workpiece to remove debris from a second tip of the pin when the length is determined to be above the first limit until the length is below the first limit; and
  performing at least one friction stir spot weld on the workpiece when the length is determined to be below the first limit.

10. A method, as set forth in claim 9, further comprising comparing the length to the first limit to determine if the length is less than the first limit, after removing debris off of the tip of the pin.

11. A method, as set forth in claim 9, wherein measuring the length is further defined as contacting a first tip of a body portion of a weld tool to an anvil to measure the length between a reference point and the anvil.

12. A method, as set forth in claim 9, wherein contacting a first tip of a body portion of a weld tool to a workpiece is further defined as contacting a first tip of a body portion of a weld tool to a workpiece until the tip of the pin achieves a cleaning plunge distance.

13. A method, as set forth in claim 9, wherein rotating the pin is further defined as rotating the pin at a speed between approximately 800 and 2,500 RPM.

14. A method, as set forth in claim 9, wherein contacting a first tip of a body portion of a weld tool to a workpiece is further defined as contacting the first tip of the body portion of a weld tool to an uppermost surface of a workpiece, adjacent a location of the at least one friction stir spot weld.

15. A method, as set forth in claim 9, further comprising:
  comparing the length to a second limit to determine if the length is above or below the second limit;
  signaling that the length is below the second limit when the length is determined to be below the second limit; and
  wherein performing at least one friction stir spot weld on the workpiece when the length is determined to be below the first limit is further defined as performing at least one friction stir spot weld on a workpiece when the length is determined to be below the first limit and above the second limit.

16. A method, as set forth in claim 9, wherein the at least one friction stir spot weld is at least three friction stir spot welds.

\* \* \* \* \*